United States Patent
Marui et al.

(10) Patent No.: US 8,744,531 B2
(45) Date of Patent: *Jun. 3, 2014

(54) SYSTEM AND METHOD FOR PROVIDING CALLING FEATURE ICONS IN A USER INTERFACE THAT FACILITATES USER SELECTION OF A COMMUNICATION LINE FOR AN OUTGOING CALL ON A MOBILE DEVICE

(71) Applicant: BlackBerry Limited, Waterloo (CA)

(72) Inventors: Keizo Marui, Waterloo (CA); Lawrence Edward Kuhl, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,017

(22) Filed: Jun. 3, 2013

(65) Prior Publication Data

US 2013/0267279 A1    Oct. 10, 2013

(51) Int. Cl.
*H04M 1/00*    (2006.01)
*H04B 1/38*    (2006.01)

(52) U.S. Cl.
USPC ........................................................ 455/566

(58) Field of Classification Search
USPC ................ 455/413, 414.1, 415, 416, 417, 455/418–420, 425, 426.1, 566
See application file for complete search history.

(56) References Cited

U.S. PATENT DOCUMENTS

| | | |
|---|---|---|
| 5,367,558 A | 11/1994 | Gillig et al. |
| 5,448,622 A | 9/1995 | Huttunen |
| 5,526,403 A | 6/1996 | Tam |
| 5,815,566 A | 9/1998 | Ramot et al. |
| 6,016,336 A | 1/2000 | Hanson |
| 6,154,660 A | 11/2000 | Singh |
| 6,256,516 B1 | 7/2001 | Wagner et al. |
| 6,285,364 B1 | 9/2001 | Giordano et al. |
| 6,289,025 B1 | 9/2001 | Pang et al. |

(Continued)

FOREIGN PATENT DOCUMENTS

| | | |
|---|---|---|
| CA | 2624042 | 9/2008 |
| CA | 2624043 | 9/2008 |

(Continued)

OTHER PUBLICATIONS

Office Action. Canadian Patent Application No. 2,624,043. Dated: Jun. 27, 2011.

(Continued)

*Primary Examiner* — Magdi Elhag
(74) *Attorney, Agent, or Firm* — Bereskin & Parr LLP/S.E.N.C.R.L., s.r.l.

(57) ABSTRACT

A system and method for providing calling feature icons in a user interface that allow users to determine with ease the status of different calling features, and in respect of at least one embodiment, to identify with ease the communication lines associated with calling features that have been enabled (and/or disabled) on the mobile device. In example embodiments, for each calling feature, at most one general calling feature icon associated with the respective calling feature is displayed in a general calling feature icon display field of a call screen if the respective calling feature applies to at least one of a plurality of communication lines accessible at the mobile device. In some embodiments, line-specific calling feature icons may also be displayed in an active line data display field and/or a line selection menu.

20 Claims, 14 Drawing Sheets

(56) References Cited

U.S. PATENT DOCUMENTS

| | | | |
|---|---|---|---|
| 6,311,055 | B1 | 10/2001 | Boltz |
| 6,366,302 | B1 | 4/2002 | Crosby et al. |
| 6,515,997 | B1 | 2/2003 | Feltner et al. |
| 6,574,470 | B1 | 6/2003 | Chow et al. |
| D479,531 | S | 9/2003 | Yanagida |
| 6,757,372 | B1 | 6/2004 | Dunlap et al. |
| 6,865,625 | B2 | 3/2005 | Davani et al. |
| 6,998,976 | B2 | 2/2006 | Kawai et al. |
| 7,020,273 | B2 | 3/2006 | Kraft et al. |
| 7,046,994 | B1 | 5/2006 | Padawer et al. |
| 7,092,495 | B2 | 8/2006 | Kraft et al. |
| 7,231,208 | B2 | 6/2007 | Robertson et al. |
| 7,231,229 | B1 | 6/2007 | Hawkins et al. |
| 7,336,260 | B2 | 2/2008 | Martin et al. |
| 7,561,682 | B2 | 7/2009 | Doherty et al. |
| 7,715,535 | B2 | 5/2010 | Vander Veen et al. |
| 7,860,489 | B2 | 12/2010 | Kuhl et al. |
| 8,463,325 | B2 | 6/2013 | Marui et al. |
| 8,478,345 | B2 | 7/2013 | Marui et al. |
| 2002/0183091 | A1 | 12/2002 | Heo |
| 2003/0083050 | A1 | 5/2003 | Kraft et al. |
| 2003/0190025 | A1 | 10/2003 | Okamura et al. |
| 2004/0137967 | A1 | 7/2004 | Bodley |
| 2004/0215845 | A1 | 10/2004 | Davani et al. |
| 2005/0009571 | A1 | 1/2005 | Chiam et al. |
| 2005/0170854 | A1 | 8/2005 | Benco et al. |
| 2006/0084450 | A1 | 4/2006 | Dam Nielsen et al. |
| 2006/0205432 | A1 | 9/2006 | Hawkins et al. |
| 2006/0234693 | A1 | 10/2006 | Isidore et al. |
| 2007/0047695 | A1 | 3/2007 | Tal et al. |
| 2007/0081641 | A1 | 4/2007 | Veen et al. |
| 2007/0123194 | A1 | 5/2007 | Karaoguz et al. |
| 2007/0129103 | A1 | 6/2007 | Al-Shaikh |
| 2007/0217132 | A1 | 9/2007 | Collins |
| 2007/0253380 | A1 | 11/2007 | Jollota et al. |
| 2008/0100693 | A1 | 5/2008 | Jobs et al. |
| 2008/0242277 | A1 | 10/2008 | Chen et al. |
| 2008/0242289 | A1 | 10/2008 | Marui et al. |
| 2008/0242356 | A1 | 10/2008 | Marui et al. |
| 2010/0159901 | A1 | 6/2010 | Vander Veen et al. |
| 2010/0297988 | A1 | 11/2010 | Kuhl et al. |

FOREIGN PATENT DOCUMENTS

| | | |
|---|---|---|
| CA | 2625550 | 9/2008 |
| CN | 1819683 | 8/2006 |
| CN | 101277326 | 10/2008 |
| CN | 101277498 | 10/2008 |
| EP | 97/35413 | 9/1997 |
| EP | 1289234 | 3/2003 |
| EP | 1628460 | 2/2006 |
| EP | 1761096 | 3/2007 |
| EP | 1768360 | 3/2007 |
| EP | 1976240 | 10/2008 |
| EP | 1976244 | 10/2008 |
| EP | 1976241 | 1/2011 |
| EP | 2512109 | 10/2012 |
| WO | 9417639 | 8/1994 |
| WO | 9821871 | 5/1998 |
| WO | 2006/067541 | 6/2006 |

OTHER PUBLICATIONS

Prosecution documents for U.S. Appl. No. 11/691,187.
European Response. European Patent Application No. 07104938.1. Dated Feb. 13, 2008.
Decision to grant a European patent pursuant to Article 97(1) EPC. European Patent Application No. 07104938.1. Dated: Oct. 15, 2009.
Canadian Notice of Allowance. Canadian Patent Application No. 2,624,043, Dated: Aug. 21, 2012.
Indian Office Action. Indian Patent Application No. 1423/CHENP/2008. Dated: Aug. 27, 2012.
Amendment. Co-pending U.S. Appl. No. 12/852,551. Dated: Jan. 26, 2012.
Final Office Action. Co-pending U.S. Appl. No. 12/852,551. Dated: Apr. 10, 2012.
Response after Final. Co-pending U.S. Appl. No. 12/852,551. Dated: Jun. 7, 2012.
Advisory Action. Co-pending U.S. Appl. No. 12/852,551. Dated: Jun. 21, 2012.
Notice of Appeal. Co-pending U.S. Appl. No. 12/852,551. Dated: Jul. 10, 2012.
Notice of Panel Decision from Pre-Appeal Brief Review. Co-pending U.S. Appl. No. 12/852,551. Dated: Aug. 13, 2012.
Appeal Brief. Co-pending U.S. Appl. No. 12/852,551. Dated: Sep. 13, 2012.
Examiner's Answer. Co-pending U.S. Appl. No. 12/852,551. Dated: Dec. 7, 2012.
Reply Brief. Co-pending U.S. Appl. No. 12/852,551. Dated: Feb. 7, 2013.
European Search and Exam Report for European Patent Application No. 07104938.1, dated Sep. 18, 2007.
Amendment. Co-pending U.S. Appl. No. 12/718,070. Dated: Mar. 27, 2012.
Terminal Disclaimer. Co-pending U.S. Appl. No. 12/718,070. Dated: Mar. 27, 2012.
Final Office Action. Co-pending U.S. Appl. No. 12/718,070. Dated: Jun. 15, 2012.
Amendment and Request for Continued Examination (RCE). Co-pending U.S. Appl. No. 12/718,070. Dated: Nov. 15, 2012.
Sony Ericsson Mobile Communications AB, "P900 User Guide" 2003, XP002479719.
Notice of Allowance Received. Chinese Patent Application No. 200810086780.0. Dated: Sep. 27, 2011.
Office Action. Co-pending U.S. Appl. No. 12/852,551. Dated: Oct. 28, 2011.
Prosecution documents for U.S. Appl. No. 11/691,051.
European Communication under Rule 71(3) EPC. Application No. 07104938.1. Dated: May 12, 2009.
Office Action. Co-pending U.S. Appl. No. 12/718,070. Dated: Oct. 28, 2011.
Final Office Action. Co-pending U.S. Appl. No. 12/852,551. Dated: May 19, 2011.
Response and Request for Continued Examination. Co-pending U.S. Appl. No. 12/852,551. Dated: Jul. 14, 2011.
Prosecution documents for U.S. Appl. No. 11/691,172.
Office Action. Co-pending U.S. Appl. No. 12/852,551. Dated: Dec. 29, 2010.
Response. Co-pending U.S. Appl. No. 12/852,551. Dated: Mar. 29, 2011.
Terminal Disclaimer & Extension of Time. Co-pending U.S. Appl. No. 12/852,551. Dated: Mar. 30, 2011.
Prosecution documents for U.S. Appl. No. 11/235,509.
"Nextel Alternate Line Service FAQs" prior to Feb. 9, 2005.
Office Action. Chinese Patent Application No. 200810086780.0. Dated: Mar. 9, 2011.
United States Patent Trial and Appeal Board Docketing Notice for U.S. Appl. No. 12/852,551, dated Feb. 15, 2013.
Information Disclosure Statements and Notices of References Cited for U.S. Appl. No. 12/718,070.
Information Disclosure Statements and Notices of References Cited for U.S. Appl. No. 12/852,551.

SYSTEM AND METHOD FOR PROVIDING CALLING FEATURE ICONS IN A USER INTERFACE THAT FACILITATES USER SELECTION OF A COMMUNICATION LINE FOR AN OUTGOING CALL ON A MOBILE DEVICE

CROSS-REFERENCE TO RELATED APPLICATION

This application is a continuation of prior U.S. patent application Ser. No. 11/691,187, filed on Mar. 26, 2007 and issued to patent as U.S. Pat. No. 8,463,325. The entire contents of U.S. patent application Ser. No. 11/691,187 are hereby incorporated by reference.

TECHNICAL FIELD

Embodiments described herein relate generally to user interfaces provided by mobile device applications, and more specifically to mobile devices that allow outgoing calls to be made by a user on a communication line selected from a plurality of communication lines.

BACKGROUND

Many modern mobile devices are multi-functional. They may be configured to allow users to engage in both electronic mail ("e-mail") communications and telephone communications, for example. Additionally, it is common for a user to utilize the mobile device for different purposes. For example, a user may operate a single mobile device to engage in communications relating to both business and personal uses.

Phone-equipped mobile devices may be adapted to accommodate an Alternate Line Service (ALS) or similar service. With respect to these mobile devices, two (or more) phone numbers may be associated with a mobile device, with each phone number being associated with a different communication line. A user may wish to place an outgoing call on a specific communication line so that when the call is received by a receiving party, the phone number associated with that communication line will be identified on the receiving party's phone where "call display" functionality has been enabled on that phone. Use of multiple communication lines may also be useful for line-specific tracking purposes (e.g. to facilitate separate billing for long distance calls relating to business and personal uses).

Outgoing calls are generally initiated by a user from a call screen provided by an application (e.g. a phone application) residing and executing on the mobile device. Detailed calling feature information for multiple communication lines may be provided within a single display field on the call screen. For example, a voicemail icon marked with a line number may be displayed in the display field, to indicate that a voicemail on the communication line identified by that line number awaits consideration by the user. Similarly, a call forwarding icon marked with a line number may also be displayed in the same display field, to indicate that a "call forwarding" feature has been enabled for the communication line identified by that line number. If a particular calling feature has been enabled for multiple communication lines, multiple instances of the same icon can be displayed together in the display field, each marked with a different line number. The user is able to identify, from the collection of icons displayed in the above-mentioned display field, what calling features have been enabled and the communication lines for which they are enabled.

BRIEF DESCRIPTION OF THE DRAWINGS

For a better understanding of embodiments described herein, and to show more clearly how they may be carried into effect, reference will now be made, by way of example, to the accompanying drawings in which.

DETAILED DESCRIPTION

Figure 1:
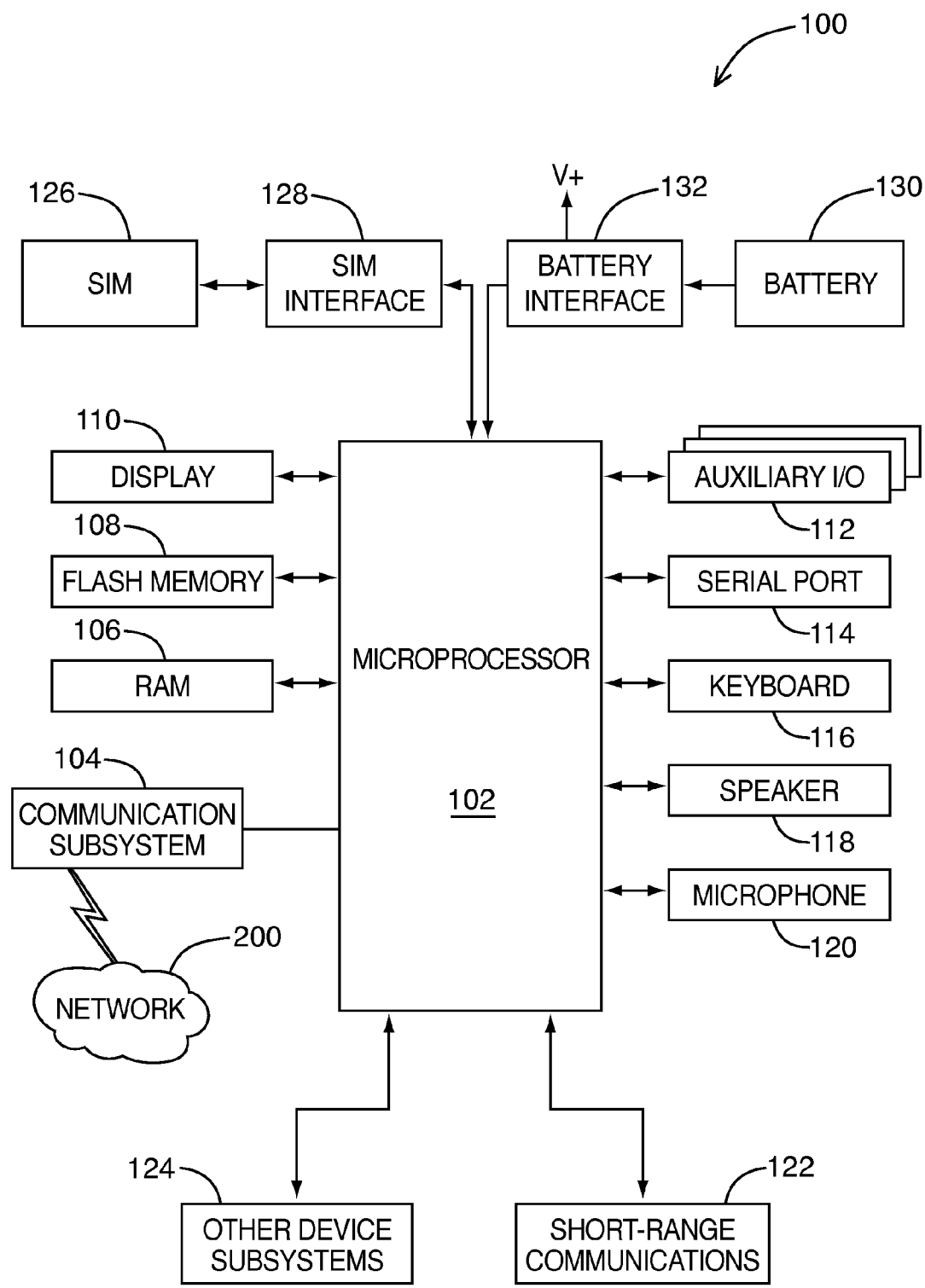
FIG. 1 is a block diagram of a mobile device in one example implementation.

In known systems providing a user interface of the type described above, where calling feature information for multiple communication lines is provided within a single display field on the call screen, the ease with which a user would be able to quickly determine what calling features have been enabled on the mobile phone and the communication line for which those calling features are enabled generally diminishes, as the number of available calling features and/or the number of communication lines provided on the mobile device increases. Clearly showing the state for each calling feature icon and for each one of a plurality of communication lines may be difficult. This can overwhelm or confuse the user particularly when the user is confronted with a large collection of icons.

Typically, in mobile device applications, only one communication line is deemed to be "active" at any given time. Outgoing calls are placed on the active line until an alternate communication line is selected. One possible solution that may be employed to address some of the above problems is to only display calling feature information for the active line in the display field in which calling feature icons are displayed. In this manner, it would not be necessary to annotate icons with line numbers or other line identifiers, since the user would know that the icons identify the status of calling features that have been enabled (or disabled) in respect of the active line only. However, a user would remain unaware of the status of a calling feature enabled on a different communication line (e.g. when a voicemail has been received in association with a communication line that is not the active line) until that communication line is selected as the active line, which may be undesirable.

Embodiments described herein are generally directed to a system and method for providing calling feature icons in a user interface that allows mobile device users to determine with ease the status of different calling features. For example, in respect of at least one embodiment, easier identification of the communication lines associated with calling features that have been enabled (and/or disabled) on the mobile device while conserving screen space is facilitated.

In a broad aspect, there is provided a method of providing calling feature icons in a user interface that facilitates user selection of a communication line for an outgoing call on a mobile device, the mobile device providing access to a plurality of communication lines on which outgoing calls may be made by a user, the method comprising the steps of: providing a call screen on a display of the mobile device; determining a status of each of at least one calling feature for each of the plurality of communication lines; and displaying, for each of the at least one calling feature, at most one general calling feature icon associated therewith in a general calling feature icon display field of the call screen if the respective calling feature applies to at least one of the plurality of communication lines.

In yet another broad aspect, the method of providing calling feature icons in a user interface further comprises the steps of: displaying data identifying a first of the plurality of communication lines in an active line data display field of the call screen; and displaying, for each of the at least one calling feature, a line-specific calling feature icon in the active line data display field if the respective calling feature applies to the first communication line.

In another broad aspect, the method of providing calling feature icons in a user interface further comprises the steps of: receiving a first input from the user, the first input comprising a direction to display on the call screen a line selection menu, wherein the line selection menu comprises data identifying at least a subset of the plurality of communication lines; displaying the line selection menu on the call screen after receiving the first input; and displaying, for each of the at least one calling feature and for each communication line of the subset, a line-specific calling feature icon in the line selection menu if the respective calling feature applies to the respective communication line.

In another broad aspect, the method of providing calling feature icons in a user interface further comprises the steps of: receiving a second input from the user, the second input identifying a user-selected second communication line of the subset; updating an active line data display field of the call screen by displaying data identifying the second communication line in the active line data display field; wherein the updating step further comprises displaying, for each of the at least one calling feature, a line-specific calling feature icon in the active line data display field if the respective calling feature applies to the second communication line.

These and other aspects and features of various embodiments will be described in greater detail below.

Some embodiments described herein make use of a mobile station. A mobile station is a two-way communication device with advanced data communication capabilities having the capability to communicate with other computer systems, and is also referred to herein generally as a mobile device. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 2:
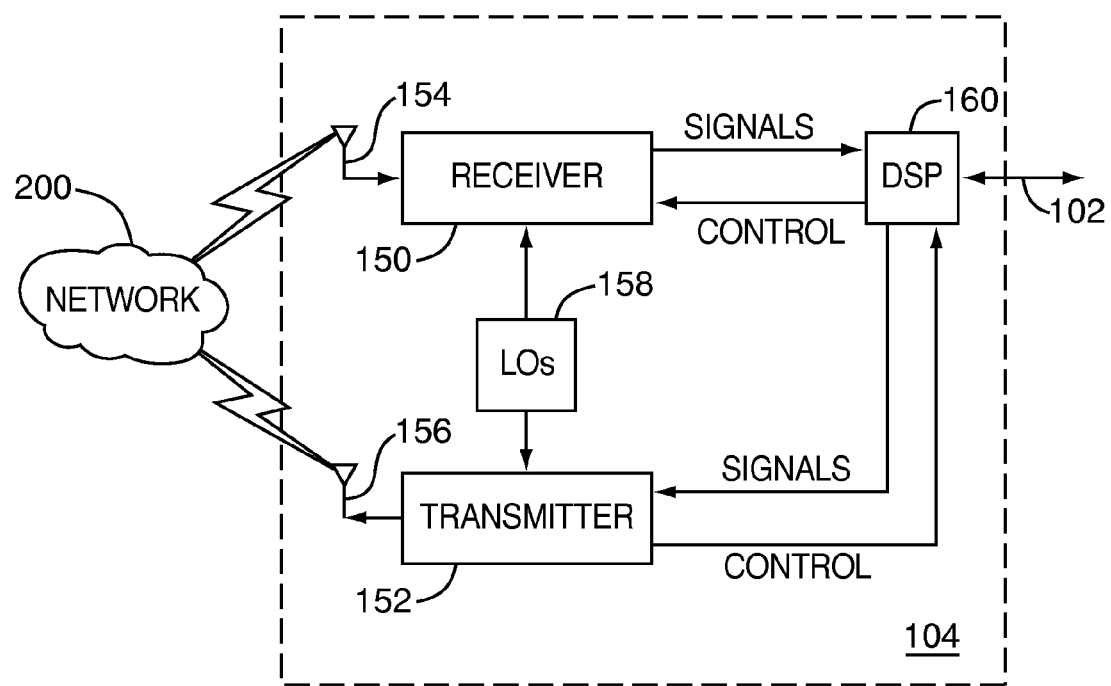
FIG. 2 is a block diagram of a communication subsystem component of the mobile device of FIG. 1.
Figure 3:
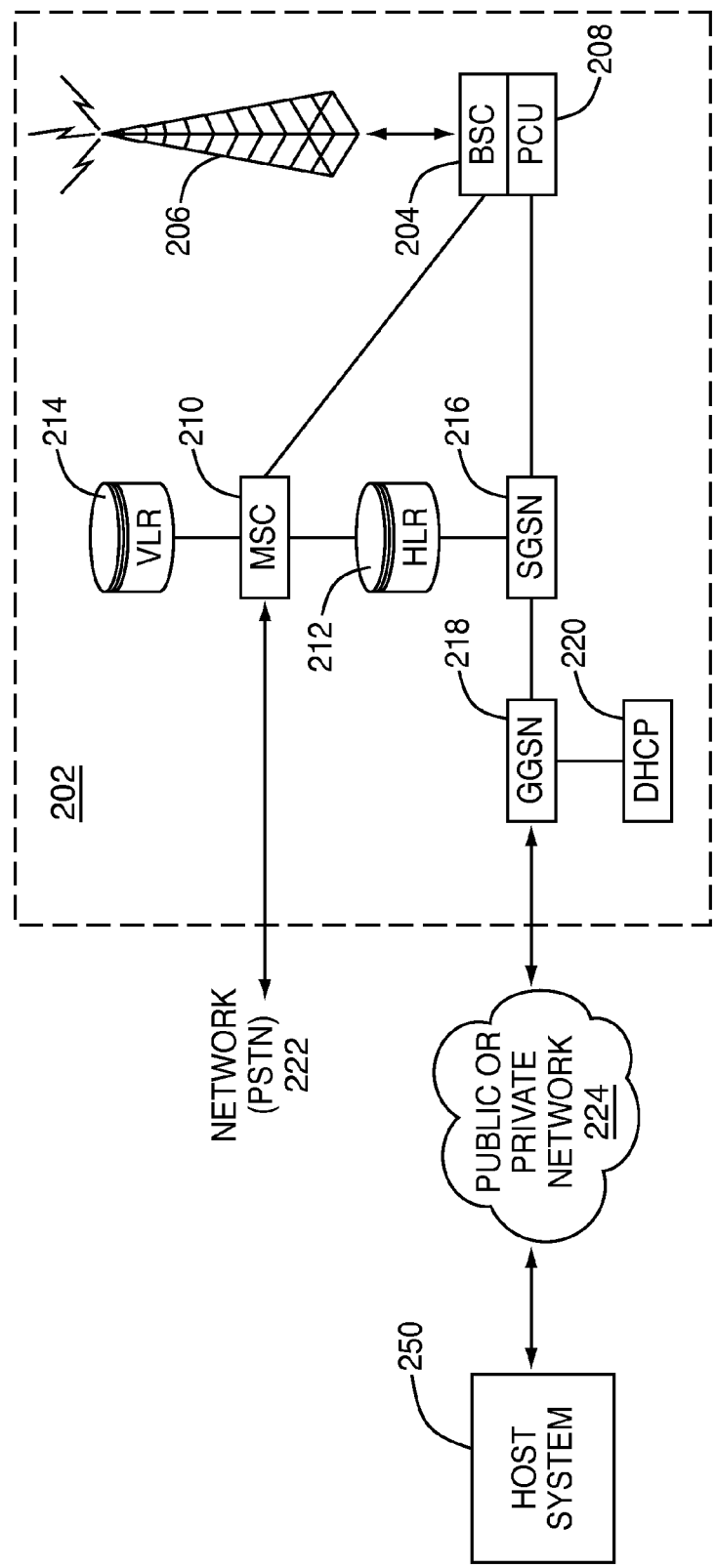
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary 110 subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSNs 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be de-allocated and the IP address returned to the IP address pool managed by DHCP server 220.

Figure 4:
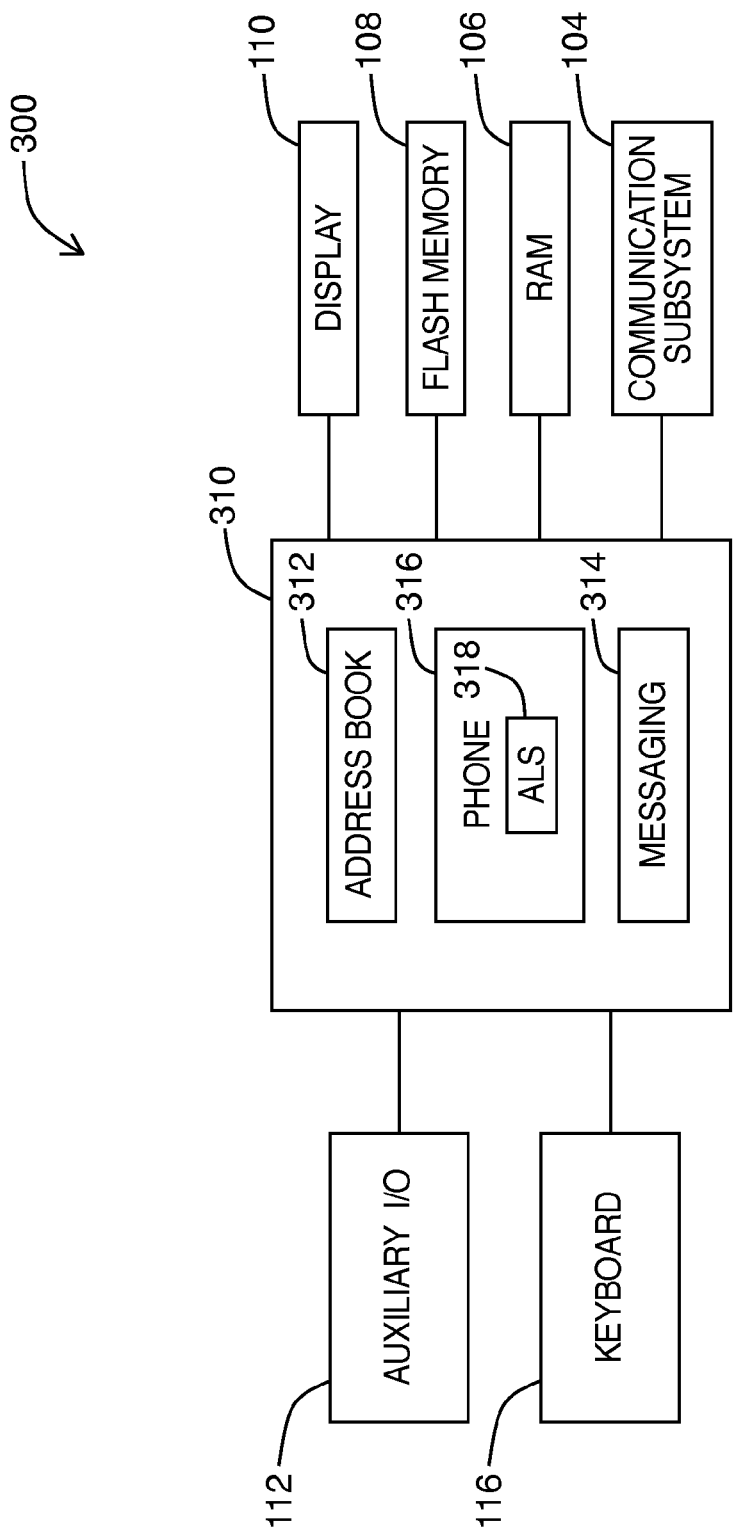
FIG. 4 is a block diagram illustrating further aspects of the mobile device of FIG. 1.

Referring now to FIG. 4, a block diagram illustrating further aspects of mobile device 100 of FIG. 1 is shown generally as 300. As noted earlier with reference to FIG. 1, microprocessor 102, in addition to its operating system functions, enables execution of software applications on mobile device 100. A set of applications that control basic device operations, including data and voice communication applications, will normally be installed on mobile device 100 during its manufacture. Operating system software and other software applications are typically stored in a persistent store (e.g. flash memory 106) or other store, on mobile device 100 or on a device coupled thereto. It will be understood that the operating system, software applications or parts thereof, may be temporarily loaded in a volatile store such as RAM 106. Other instructions and/or data received by the mobile device 100 and subject to processing may also be temporarily stored in RAM 106.

Software applications that are loaded or stored on mobile device 100 may be implemented as functional components or modules 310. Modules 310 interact with various components of mobile device 100. For instance, as shown by way of example in FIG. 4, modules 310 may interact with communication subsystem 104, RAM 106, flash memory 108, display 110, auxiliary I/O device(s) 112, and keyboard 116. Modules 310 may comprise, for example, an address book module 312, a messaging module 314 (e.g. for e-mail and/or SMS or MMS messaging), and a phone application module 316.

Address book module 312 is generally configured to allow contact information (e.g. individual contact and company names, telephone numbers, messaging addresses, and other information) to be stored and managed. Messaging module 314 facilitates the sending and receiving of electronic messages over a wireless network 200 and/or other network.

Phone application module 316 is generally configured to facilitate voice communication between the user and other parties, including the placement of outgoing calls by the user and the reception of incoming calls on the mobile device 100.

Calls may be placed and received on a communication line specifically configured for voice communications. In certain embodiments, calls may alternatively or additionally be placed and received on other types of communication lines, including a communication line generally configured for data communications, or a communication line configured for both voice and data communications, for example. For example, mobile device 100 may be configured to provide Voice over IP (VoIP), Enterprise Voice, and/or video phone functionality.

Embodiments described herein are generally applicable to mobile devices that provide access to multiple (i.e. two or more) communication lines on which outgoing calls may be placed, as initiated by a mobile device user. Typically, these mobile devices will also be configured to allow incoming calls to be received by the user over the same communication lines.

In example embodiments, each of the multiple communication lines has a different telephone number associated therewith. For example, a user may have a business phone number and a different personal phone number. When a user places an outgoing call on a specific communication line, the phone number associated with that communication line may be identified on a receiving party's phone that is equipped with "call display" functionality.

Referring again to FIG. 4, a line selection module (e.g. alternate line service (ALS) module) 318 is provided to facilitate selection of the communication line to be used by phone application module 316 for placing an outgoing call, for example. The line selection module 318 is configured to select a communication line to be used by phone application module 316, based upon line selection data stored on mobile device 100 (e.g. configuration settings that define a default communication line), and/or based upon input received by the user. It will be understood that the functionality of line selection module 318 may be provided or otherwise integrated with phone application module 316 or with a different module on mobile device 100.

The currently selected communication line on which an outgoing call may be placed at any given time is also referred to herein as the "active" line. Outgoing calls will be placed on the active line by phone application module 316 until an alternate communication line is selected.

When a user wishes to initiate an outgoing call, the user will typically be required to access a call screen provided by an application (e.g. phone application module 316) on mobile device 100. Data identifying the active line will be displayed to the user in a first display field, (e.g. "My Number" field, or phone status field) of the call screen, allowing the user to quickly identify the communication line on which an outgoing call will be placed should the user to choose to initiate such call. This display field may also be referred to as an active line data display field. The data identifying the active line typically comprises a telephone number, but may alternatively or additionally comprise some other communication line identifier(s), such as a line descriptor, alias, and/or other identifier, for example.

Since mobile devices may provide access to multiple communication lines, and since multiple calling features (e.g. voicemail, call forwarding, call waiting, call barring, and/or missed call detection) may be applied to each communication line, showing the status of each calling feature for each communication line in a manner that does not confuse the user can be difficult, particularly on devices with limited screen space.

For example, on the one hand, providing icons showing the status of every calling feature for every communication line on a display even when such information is not immediately required by a user (e.g. where one communication line is in use more often than others), while providing detailed information to the user, may overwhelm or confuse the user. This approach may also require excessive screen space, which is often limited on a device such as a mobile device.

However, on the other hand, displaying only icons for the active line, while conserving screen space, may not provide sufficient information regarding the status of calling features in respect of other communication lines to the user in a convenient manner.

Embodiments described herein are generally directed to a system and method for providing calling feature icons in a user interface that allow users to determine with ease the status of different calling features, and in respect of at least one embodiment, to identify with ease the communication lines associated with calling features that have been enabled (and/or disabled) on the mobile device.

In one example embodiment, the calling features comprise at least one of call forwarding and voicemail.

In variant embodiments, other calling features may be provided in addition to or instead of one or more of the call forwarding and voicemail calling features.

For example, missed call detection may be enabled such that a calling feature icon (e.g. a general calling feature icon and/or one or more line-specific calling feature icons, as described herein) is displayable to indicate that a call was unanswered on a given communication line.

As a further example, call waiting may be enabled such that a calling feature icon is displayable to indicate that the user will be alerted to the reception of a call on the mobile device while the user is engaged in a different call.

As a further example, call barring (or "restricted phone list") may be enabled to indicate that the mobile device has been configured to allow only certain numbers to be called using a specific communication line. For example, the mobile device may be configured so that only an office number can be called using a business line, while any number can be called using a personal line. As a further example, the mobile device may be configured so that long distance calls may not be made from a particular communication line. The particular call barring restrictions may be enforced by way of a security policy ("IT Policy"), as may be defined by an administrator, for example.

While a calling feature icon may be displayed to indicate that a particular feature has been activated or enabled for a particular communication line, a calling feature icon may also be displayed to indicate that a particular calling feature has been disabled for the communication line in variant embodiments.

In example embodiments, for each calling feature, at most one general calling feature icon associated with the respective calling feature is displayed in a general calling feature icon display field of a call screen if the respective calling feature applies to at least one of a plurality of communication lines accessible at the mobile device.

For example, in one embodiment, at most one call forwarding icon is displayed in the general calling feature icon display field of the call screen if call forwarding has been enabled on at least one of the plurality of communication lines.

For example, in one embodiment, at most one voicemail icon is displayed in the general calling feature icon display field of the call screen if at least one voicemail message associated with at least one of the plurality of communication lines is stored.

Similarly, in other embodiments, for any other given calling feature supported by the mobile device, at most one general calling feature icon is displayed in the general calling feature icon display field if the respective calling feature has been, for example, enabled on the mobile device.

As described herein, general calling feature icons (or "ribbon indicators") are displayable in the general calling feature icon display field of the call screen. The placement of this display field within the user interface can vary depending on implementation. For example, the general calling feature icons may be displayed in its own header or ribbon, above where the data identifying the active line is displayed.

The general calling feature icons are not intended to identify the specific communication lines for which certain calling features are enabled, rendering it unnecessary to annotate icons with line numbers, for example. The general calling feature icons indicate that the status of a particular calling feature applies to at least one of the multiple communication lines accessible at the mobile device. In certain embodiments, the user can rely instead on information provided by line-specific calling feature icons (e.g. as shown in display field where data identifying the active line is displayed or in entries of a line selection menu, as described below) to determine the status of a particular calling feature for a given communication line.

In at least one embodiment, for each calling feature, a line-specific calling feature icon associated with the respective calling feature is displayed in an active line data display field if the respective calling feature applies to the active line.

For example, in one embodiment, a call forwarding icon is displayed in the active line data display field of the call screen if call forwarding has been enabled on the active line.

For example, in one embodiment, a voicemail icon is displayed in the active line data display field of the call screen if at least one voicemail message associated with the active line is stored.

Similarly, in other embodiments, for any other given calling feature supported by the mobile device, at most one line-specific calling feature icon is displayed in the active line data display field of the call screen if the respective calling feature has been, for example, enabled on the mobile device.

In one embodiment, where one communication line replaces another as the active line (e.g. in response to a user selection of a new active line), data in the active line data display field is updated. In particular, for each calling feature, a line-specific calling feature icon associated with the respective calling feature is displayed in the active line data display field if the respective calling feature applies to the new active line.

In some embodiments, calling feature icons may be displayed in a system configured to provide a line selection menu on a call screen of the mobile device. In one example of such system, a direction to display a line selection menu on the call screen is received from the user, where the line selection menu is comprised of data identifying one or more of the multiple communication lines accessible at the mobile device. For example, for each communication line on which the user may place an outgoing call, the telephone number associated with the respective communication line may be displayed in the line selection menu. As a further example, one or more line descriptors, aliases and/or other identifiers may be displayed, in addition to or instead of the telephone number. In response to a direction received from the user, the line selection menu is displayed on the call screen, and an input identifying a user-selected communication line is received. The active line data display field is updated accordingly.

In at least one embodiment, for each calling feature, and for each communication line identified in a line selection menu, a line-specific calling feature icon associated with the respective calling feature is displayed in the line selection menu if the respective calling feature applies to the respective communication line.

For example, in one embodiment, a call forwarding icon is displayed in association with a given communication line identified in the line selection menu if call forwarding has been enabled on that communication line.

For example, in one embodiment, a voicemail icon is displayed in association with a given communication line identified in the line selection menu if at least one voicemail message associated with that communication line is stored.

Similarly, in other embodiments, for any other given calling feature supported by the mobile device, at most one line-specific calling feature icon is displayed in association with a given communication line identified in the line selection menu if the respective calling feature has been, for example, enabled for that communication line on the mobile device.

Figure 5:
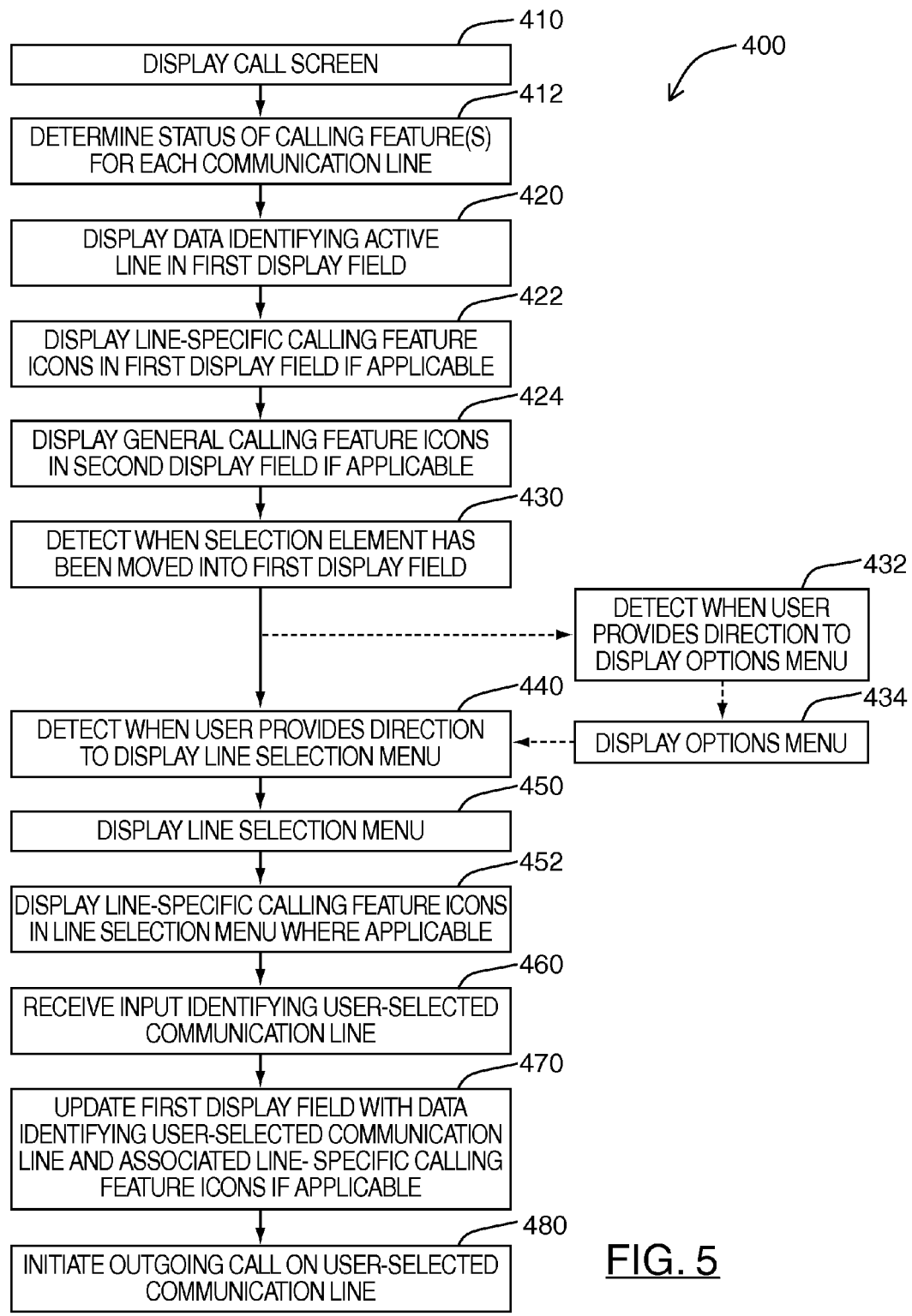
FIG. 5 is a flowchart illustrating steps of a method of providing calling feature icons in a user interface that facilitates user selection of a communication line for an outgoing call on a mobile device in accordance with at least one embodiment.

Referring now to FIG. 5, a flowchart illustrating steps of a method of providing calling feature icons in a user interface that facilitates user selection of a communication line for an outgoing call on a mobile device in accordance with at least one embodiment is shown generally as 400. Additional details of some of the features described below in respect of the steps of method 400 may be described earlier in the present specification.

In one embodiment, the steps of method 400 are performed at the mobile device by an application (e.g. phone application module 316 of FIG. 4) that executes and resides on the mobile device (e.g. mobile device 100 of FIG. 1). The application need not be a stand-alone application, and the functionality described herein may be implemented in one or more applications executing and residing on the mobile device.

At step 410, a call screen is provided. The call screen is displayed to the user on a display (e.g. display 110 of FIG. 1) of the mobile device. A user may access the call screen when the user wishes to initiate an outgoing call. This may require first activating a phone application or other application on the mobile device, by selecting a corresponding item or icon from a menu or home screen, for example (not shown).

The mobile device provides access to multiple communication lines on which outgoing calls may be placed. At step 412, the status of each of at least one calling feature (e.g. call forwarding, voicemail) is determined for each of the communication lines.

At step 420, data identifying a first of the multiple communication lines accessible at the mobile device is displayed in a first display field ("active line data display field") of the call screen. The first display field may be referred to as a "My Number" field or a "phone status" field, and data displayed therein identifies the active line, allowing the user to quickly identify the line on which an outgoing call will be placed should the user to choose to initiate one.

The data identifying the active line typically comprises a telephone number associated with the active line, but may alternatively or additionally comprise some other communication line identifier(s), such as, for example, one or more aliases, identifiers and/or other descriptors (e.g. "My Business Line", "My Personal Line"), which may be user-defined.

At step 422, one or more line-specific calling feature icons associated with the active line may also be displayed in the first display field of the call screen. For example, if call forwarding has been enabled for the active line, a call forwarding icon is displayed in the first display field at this step. As a further example, if a voicemail message for the active line is stored, a voicemail icon is displayed in the first display field at this step. As a further example, other line-specific calling feature icons associated with the active line may be displayed at this step (e.g. for call waiting, call barring, and/or missed call detection).

At step 424, one or more general calling feature icons may be displayed in a second display field ("general calling feature icon display field"). For each calling feature provided by the mobile device, a general calling feature icon is displayed at this step if the respective calling feature applies to at least one of the multiple communication lines accessible at the mobile device.

For example, where a mobile device provides access to two communication lines (e.g. a business line and a personal line), a general call forwarding icon is displayed if either communication line has call forwarding enabled. Similarly, a general voicemail icon is displayed if either communication line has a voicemail message stored (e.g. a voicemail message for a call received on the particular communication line that has not been listened to or read by the user). Similarly, a general calling feature icon for any other given calling feature supported by the mobile device is displayed if the respective calling feature has been, for example, enabled on either communication line.

It will be understood by persons skilled in the art that steps 420, 422 and 424 may be performed in a different order.

Subsequently, an input comprising a direction to display a line selection menu on the call screen is received from the user. In one embodiment, the step of receiving the input comprising a direction to display a line selection menu on the call screen comprises: detecting when a selection element (e.g. a highlight bar, pointer, cursor, or other means to identify and select menu or list items) displayed on the call screen has been moved into the first display field as shown at 430, and subsequently detecting when the user provides the direction to display the line selection menu while the selection element is settled in the first display field as shown at 440.

The selection element may be re-positioned at the direction of the user, using an input device such as a track wheel, track ball, keyboard, mouse, or other input device. For example, the user may use a track wheel or track ball on the mobile device, where provided, to manipulate a highlight bar shown in the display. In particular, by rotating the track wheel or track ball in this example, the highlight bar may be re-positioned to highlight the data displayed in the first display field (e.g. the telephone number associated with the active line) of the call screen. Once data identifying the active line is highlighted, by manipulating the track wheel or track ball so that the highlight bar settles in the first display field, the user may then take further action. For example, the user may depress the track wheel or track ball to direct that the line selection menu be displayed.

In a variant embodiment, the step of receiving the input comprising a direction to display a line selection menu on the call screen comprises: optionally detecting when the selection element (e.g. a highlight bar, pointer, cursor, or other means to identify and select menu or list items) displayed on the call screen has been moved into the first display field as shown at 430, subsequently detecting when the user provides a direction to display an options menu while the selection element is settled in the first display field as shown at 432, and displaying the options menu as shown at 434. The options menu provides the user with an option to display the line selection menu, and the flow of method steps proceeds to step 440, to detect when the user provides the direction to display the line selection menu by selecting the corresponding option.

In some embodiments, the user may be able to provide the direction to display the line selection menu through the display options menu; in other embodiments, the options menu is not provided to the user (in which case, steps 432 and 434 would not be performed). In other embodiments, the user may be able to provide the direction to display the line selection menu with or without the benefit of the options menu as determined by the specific input provided by the user after the selection element has been moved into the first display field.

At step 450, the line selection menu is displayed to the user in response to the input comprising a direction to display a line selection menu on the call screen received from the user, as detected at step 440. The line selection menu comprises data identifying at least a subset of the multiple communication lines accessible at the mobile device. For example, the line selection menu identifies all the communication lines on which the user may make an outgoing call.

In one embodiment, data identifying the currently active line appears first in the line selection menu.

In one embodiment, the line selection menu overlaps the first display field, such that data in the first display field is not visible to the user when the line selection menu is displayed.

It may be the case that the mobile device provides access to multiple communication lines, but not all are activated for use, the use of certain lines has been restricted in some manner (e.g. as configured by a security policy), or certain lines are otherwise unavailable, for example. In one embodiment, the line selection menu comprises data identifying only the communication lines that have been activated and on which the user is permitted to place an outgoing call. In one embodiment, for each calling feature, a general calling feature icon for the respective calling feature is displayed at step 424 only if the respective calling feature applies to at least one of the communication lines that have been activated and on which the user is permitted to place an outgoing call.

The data for any given communication line represented in the line selection menu typically comprises a telephone number, but may alternatively or additionally comprise some other communication line identifier(s), such as, for example, one or more aliases, identifiers and/or other descriptors (e.g. "My Business Line", "My Personal Line"), which may be user-defined.

At step 452, for each calling feature, and for each communication line, a line-specific calling feature icon associated with the respective communication line may also be displayed in association with the corresponding menu item in the line selection menu if the respective calling feature applies to the respective communication line.

For example, a call forwarding icon is displayed for each communication line identified in the line selection menu that has call forwarding enabled. Similarly, a voicemail icon is displayed for each communication line identified in the line selection menu that has a voicemail message stored (e.g. a voicemail message for a call received on the particular communication line that has not been listened to or read by the user). Similarly, for each communication line identified in the line selection menu, a line-specific calling feature icon for any given calling feature supported by the mobile device is displayed if the respective calling feature has been, for example, enabled on the respective communication line.

In one embodiment, where the communication lines are identified in the line selection menu in the form of a list of telephone numbers and/or other identifier(s), a line-specific calling feature icon to be displayed in association with a communication line is displayed beside the corresponding telephone number and/or other identifier(s).

Referring again to step 450, a selection element (e.g. a highlight bar, pointer, cursor, or other means to identify and select menu or list items) is displayed within the line selection menu and may be re-positioned at the direction of the user, using an input device such as a track wheel, track ball, keyboard, mouse, or other input device. For example, the user may use a track wheel or track ball on mobile device, where provided, to manipulate a highlight bar shown in the display. In particular, by rotating the track wheel or track ball in this example, the highlight bar may be re-positioned to highlight the data associated with a particular communication line (e.g. the telephone number associated with one of the subset of the multiple communication lines) displayed in the line selection menu. Once the user highlights a desired communication line, by manipulating the track wheel or track ball so that the highlight bar settles on the associated data, the user may then take further action. For example, the user may depress the track wheel or track ball to select the desired communication line.

Accordingly, at step 460, an input identifying a user-selected second communication line from the communication lines for which associated data is displayed in the line selection menu at step 450, is received from the user.

At step 470, the first display field is updated with data identifying the user-selected communication line. Accordingly, the user-selected communication line is identified to the user as the current active line. For example, the "My Number" field or phone status field may be updated with the telephone number of the user-selected communication line in one embodiment. Line-specific calling feature icons associated with the active line are also updated at this step, wherein for each calling feature, a line-specific calling feature icon is only displayed in the first display field if the respective calling feature applies to the user-selected communication line.

In one embodiment, data associated with outgoing calls previously made on the mobile device and/or with received calls (e.g. a call log) may be displayed to the user in a second display field of the call screen. In a variant embodiment, data in the second display field is also updated when data in the first display field is updated, so that data associated for calls made and/or received on the communication line now identified by the data currently displayed in the first display field (i.e. the "new" active line) would be displayed to the user [step not shown].

At step 480, an outgoing call is initiated on the user-selected communication line, identified from the line selection menu at step 460, as directed by the user. The outgoing call is initiated from the call screen in known manner.

Referring now to FIGS. 6A to 6D, screenshots of a user interface provided to a user in one example implementation of an embodiment of the method of FIG. 5 are shown.

Figure 6A:
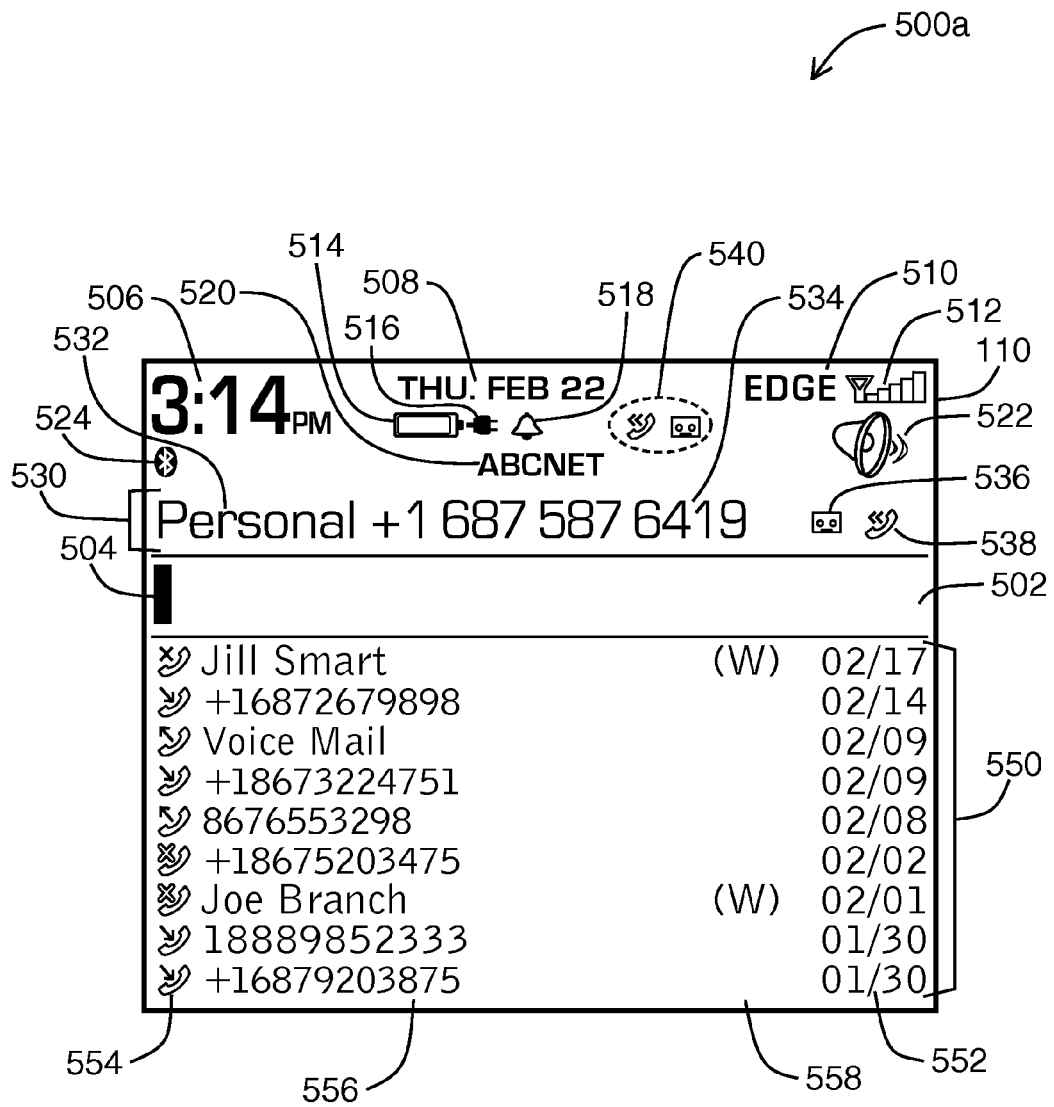
FIGS. 6A to 6D are examples of screenshots of a user interface provided to a user in accordance with an example implementation of one embodiment.

In FIG. 6A, screenshot 500a illustrates a user interface displayed in a display 110 of a mobile device 100 (FIG. 1), namely for a call screen from which the user can place outgoing calls. Call screen 500a is displayed to the user, awaiting user input (e.g. a number to be dialed). A number entry field 502 is provided, and cursor 504 is settled within number entry field 502, indicating that the user may provide a call number (e.g. using a keyboard or keypad). General indicators may be displayed on call screen 500a, including for example, time 506, date 508, network indicator 510, signal strength 512, battery strength 514, charging indicator 516, alarm indicator 518, service provider indicator 520, ringer indicator 522, and/or Bluetooth™ indicator 524.

An active line data display field 530 is also provided, which contains data identifying the active line. This data may include a line descriptor 532 (e.g. "Personal:", "Business:"), an associated telephone number 534, and/or possibly one or more line-specific calling feature icons. In this example, a voicemail icon 536 is shown indicating that a voicemail message associated with an incoming call received on the active line is awaiting consideration by the user. Further, in this example, a call forwarding icon 538 is shown indicating that a "call forwarding" feature has been activated for the active line.

One or more general calling feature icons are also provided in general calling feature icon display field 540 of call screen 500a. The icons shown in display field 540 indicate, for example, which line-specific calling features have been activated for at least one communication line accessible at the mobile device. In this manner, if certain line-specific calling feature icons are not displayed in display field 530 with respect to the active line but the corresponding general calling feature icon is displayed in display field 540, the user will know that certain calling features have been activated for a communication line other than the active line.

In this example embodiment, call screen 500a also provides a call log field 550 in which data associated with previously placed outgoing calls and received calls (e.g. including answered and missed calls) is displayed. For each such call, the associated date 552 of the call, an icon 554 indicating the nature of the call (e.g. outgoing, answered, missed), and call information (e.g. telephone number and/or contact name 556, line descriptor 558) is provided. In this particular example, call information for calls previously placed or received using the mobile device 100 is shown, which does not depend on the currently active line for which data is displayed in display field 530. However, this may differ in variant embodiments.

Figure 6B:
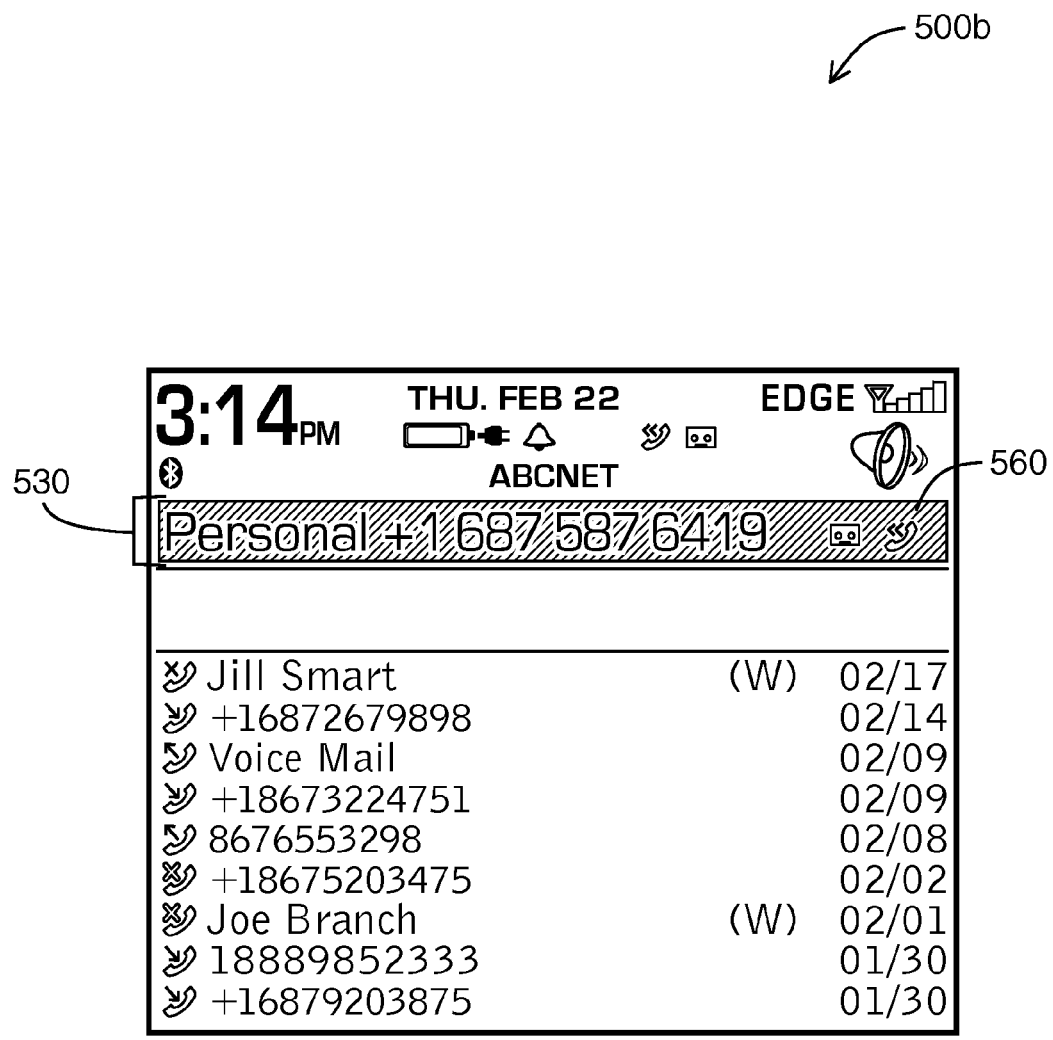

In FIG. 6B, screenshot 500b illustrates similar elements as shown in FIG. 6B, except that cursor 504 has been re-positioned by the user (e.g. by using a track wheel or track ball of the mobile device), to highlight the data associated with the active line as displayed in display field 530. Cursor 504 is now shown as a highlight bar 560 settled in display field 530.

Figure 6C:
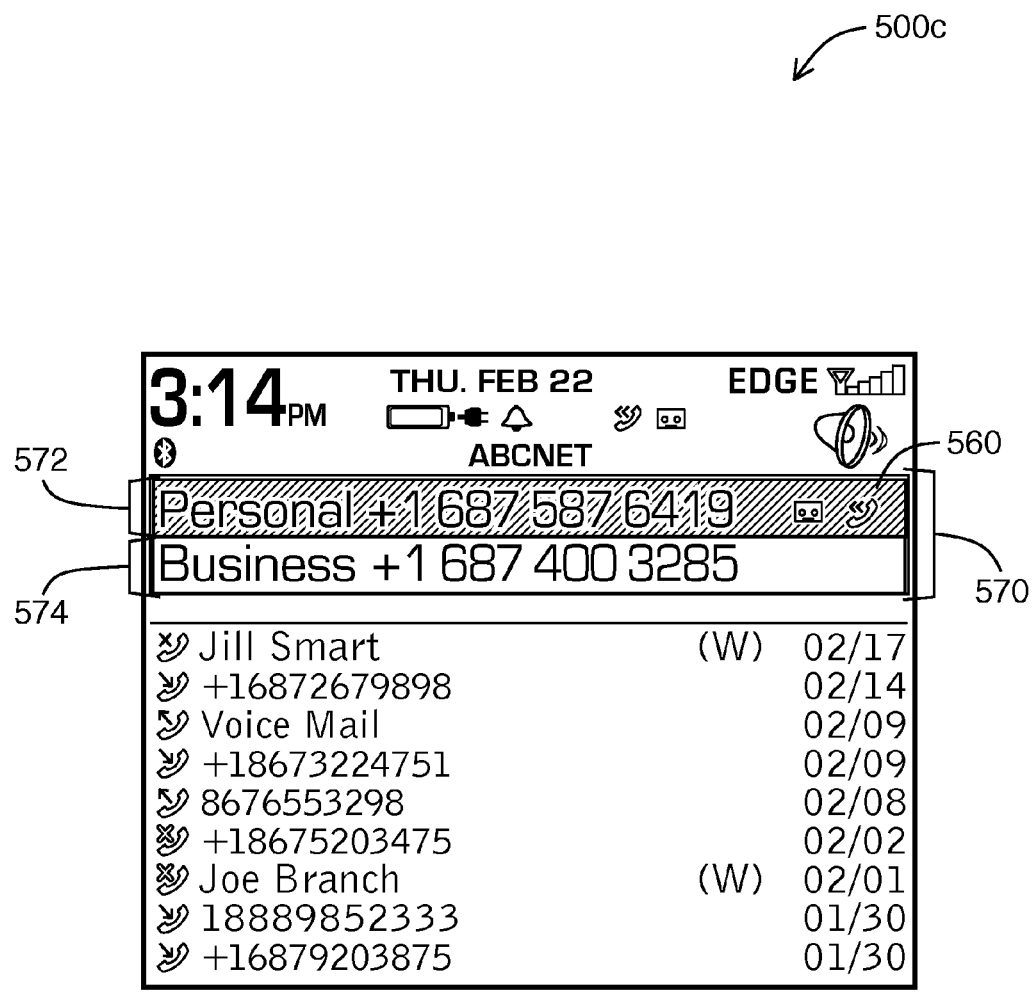
Figure 6D:
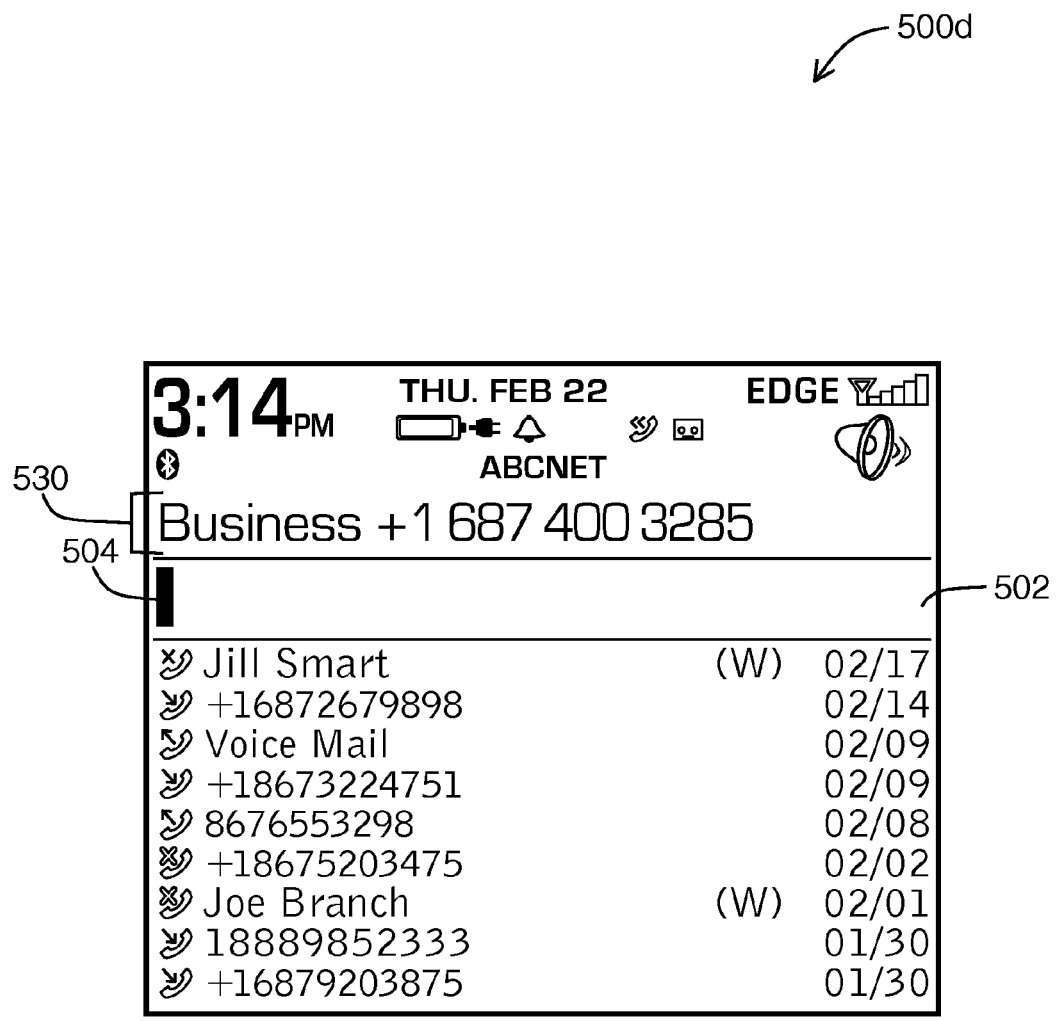

In FIG. 6C, screenshot 500c illustrates similar elements as shown in FIG. 6B, except that the user has directed that a line selection menu 570 be displayed (e.g. by depressing the track wheel or track ball of the mobile device).

Highlight bar 560 is shown initially highlighting data associated with the current active line 572 provided in line selection menu 570. Line selection menu 570 also comprises further items (where the user can access one or more alternate lines on which an outgoing call may be placed) that provide data associated with an alternate communication line 574. For each item of line selection menu 570, where each item is associated with a different communication line, the data may similarly include a line descriptor (e.g. "Personal:", "Business:"), an associated telephone number, and/or possibly one or more line-specific calling feature icons. In the example shown in FIG. 6C, the "Business" line does not have "call forwarding" activated, nor is a voicemail waiting for the user in respect of that communication line.

The user may move the highlight bar 560 to select a different item in line selection menu 570, thereby selecting a different communication line as the active line. More specifically, the user highlights the data associated with the alternate communication line 574 (e.g. using the track wheel or track ball) and selects the alternate communication line (e.g. by depressing the track wheel or track ball). When the alternate communication line has been selected by the user, the data associated with the active line as shown in display field 530 is updated to reflect the selection, as shown in screenshot 500d of FIG. 6D. Cursor 504 is settled within number entry field 502, indicating that the user may then provide a call number. Outgoing calls will be placed on the communication line identified by the data shown in display field 530 (unless the active line is changed again).

It is notable in this example that the general calling feature icons are still displayed, even though no line-specific calling feature icons are displayed in association with the new active line.

Referring now to FIGS. 7A to 7E, screenshots of a user interface provided to a user in an example implementation of another embodiment of the method of FIG. 5 are shown.

In this example, FIGS. 7A, 7B, 7D, and 7E correspond to FIGS. 6A, 6B, 6C, and 6D respectively. Features of the screenshots shown in FIGS. 7A, 7B, 7D, and 7E have been generally described in preceding paragraphs with reference to the corresponding figure of FIGS. 6A to 6D.

Figure 7A:
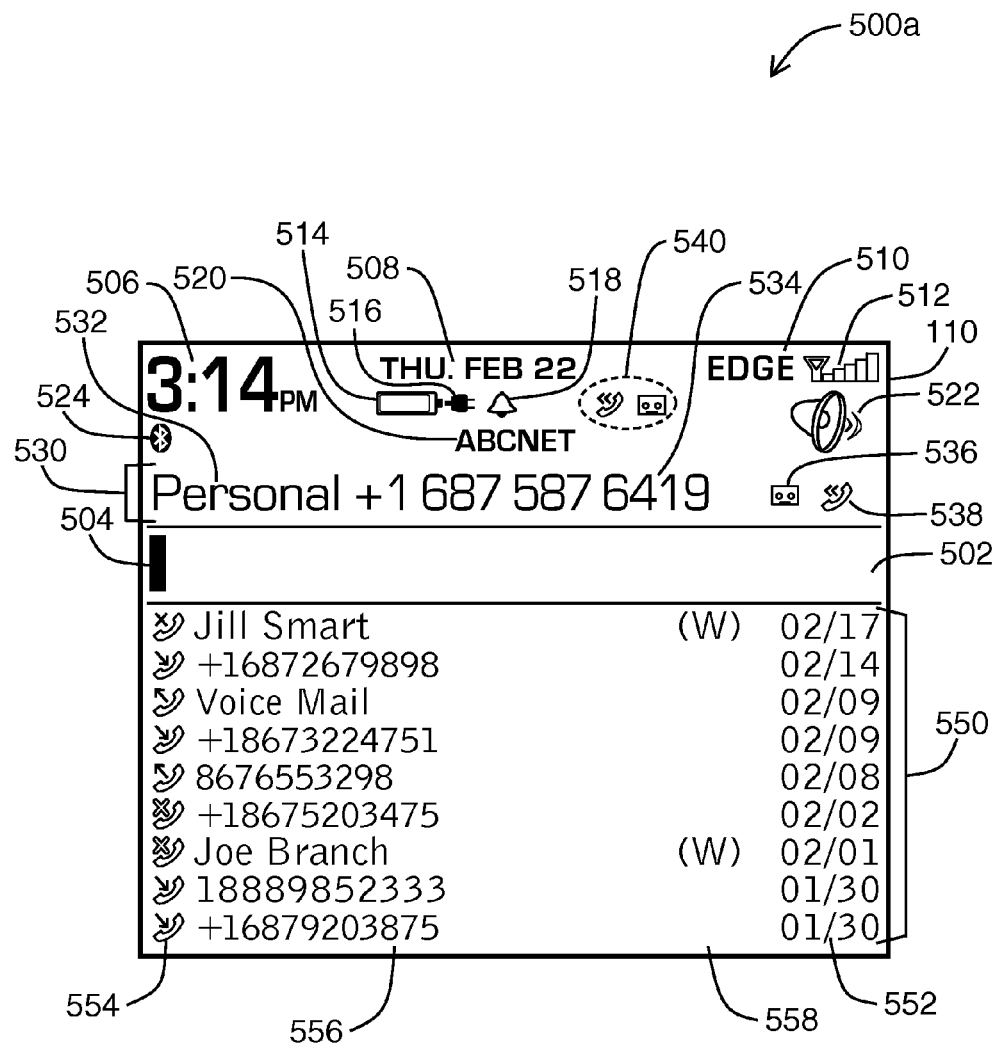
FIGS. 7A to 7E are examples of screenshots of a user interface provided to a user in accordance with an example implementation of another embodiment.
Figure 7B:
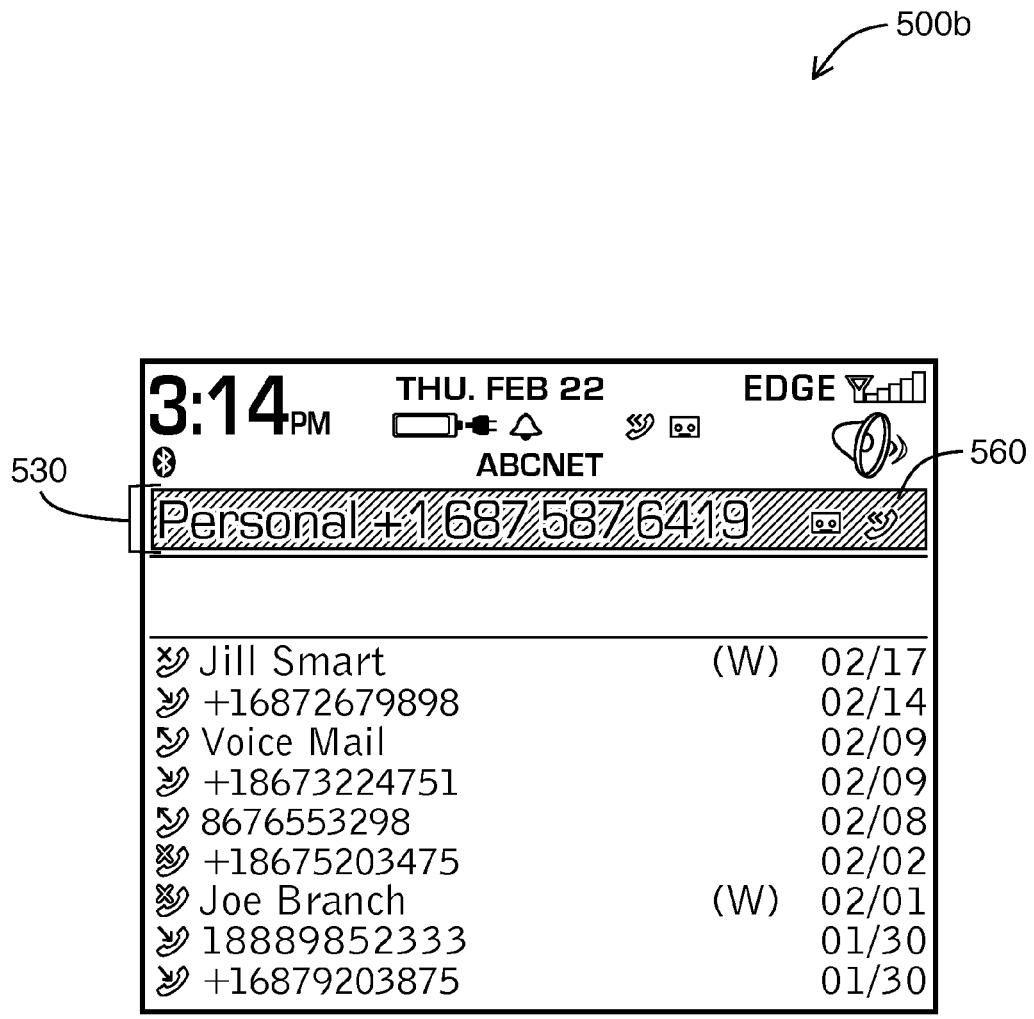
Figure 7C:
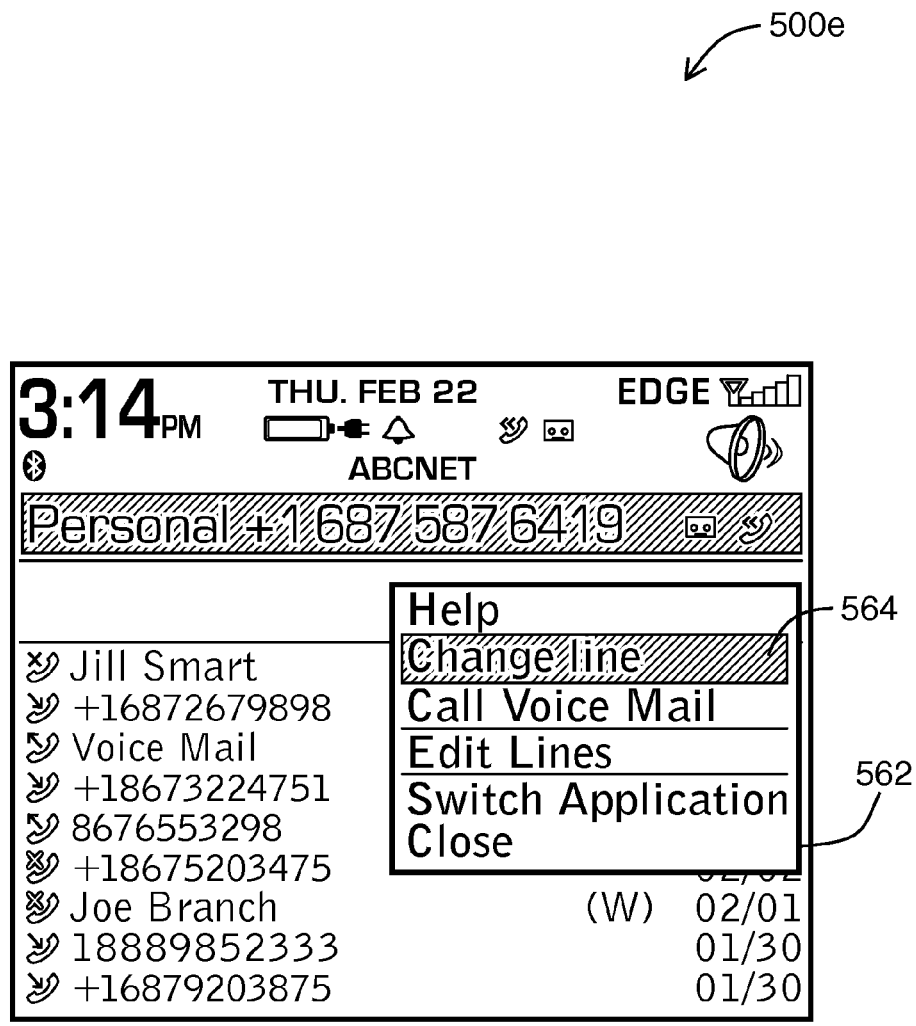

In this embodiment, the user may direct that the line selection menu 570 (shown in FIG. 7D) be displayed through an options menu 562 as shown in screenshot 500e of FIG. 7C (which would appear after screenshot 500b and before screenshot 500c in a typical sequence of operations). For example, the user may have directed that a line selection menu 570 (shown in FIG. 6D) be optionally displayed via the options menu 562 by depressing a pre-programmed menu or options key on the mobile device (e.g. or by depressing the track wheel or track ball of the mobile device depending upon the configuration).

Options menu 562 provides an option to display the line selection menu 570, shown in this example as a "Change Line" option 564 in FIG. 7C. Other options (e.g. to request help, call voice mail using the currently identified active line, edit communication line information, switch to a different application, and/or close the options menu 562) may also be provided in options menu 562. The user can navigate the options menu 562 by moving a highlight bar or other cursor for example, to select the desired option in known manner (e.g. by depressing the track wheel or track ball of the mobile device so as to make a selection).

Figure 7D:
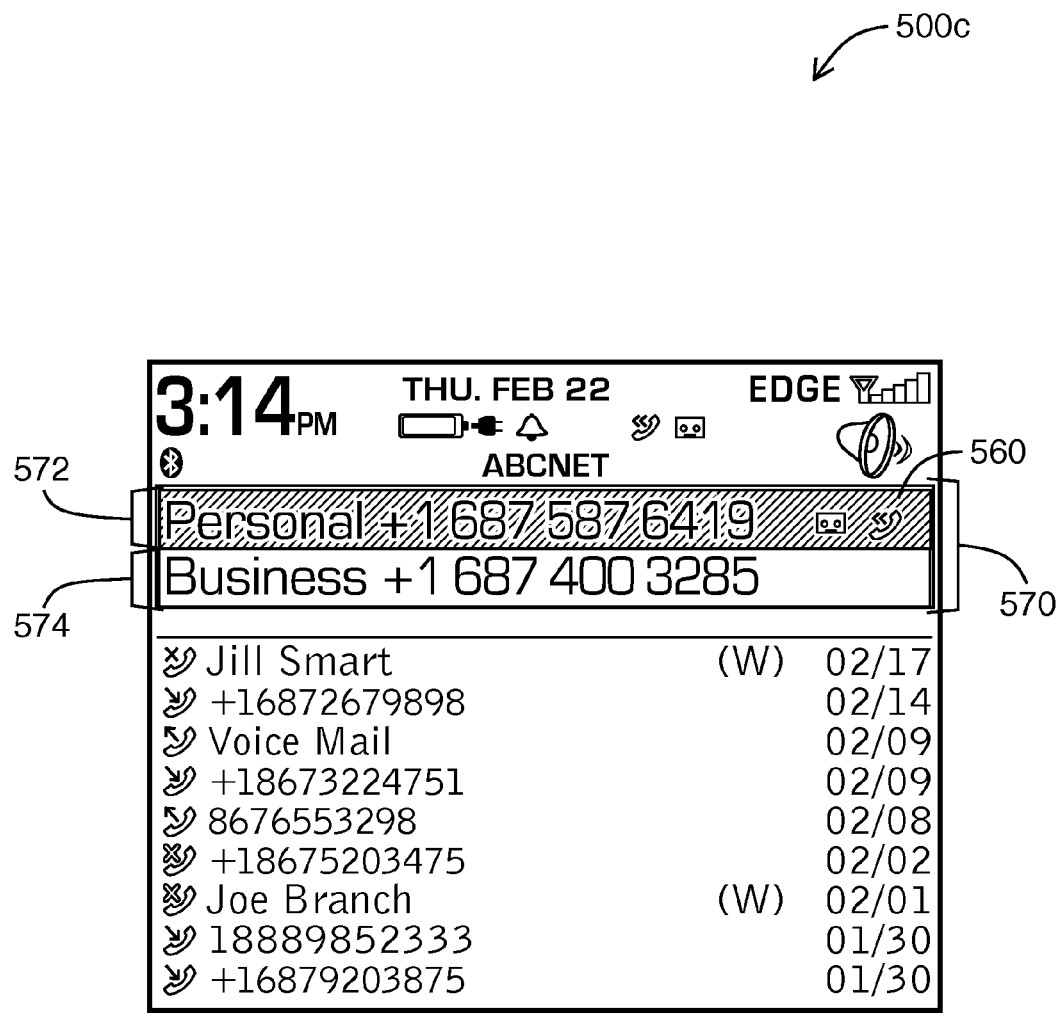
Figure 7E:
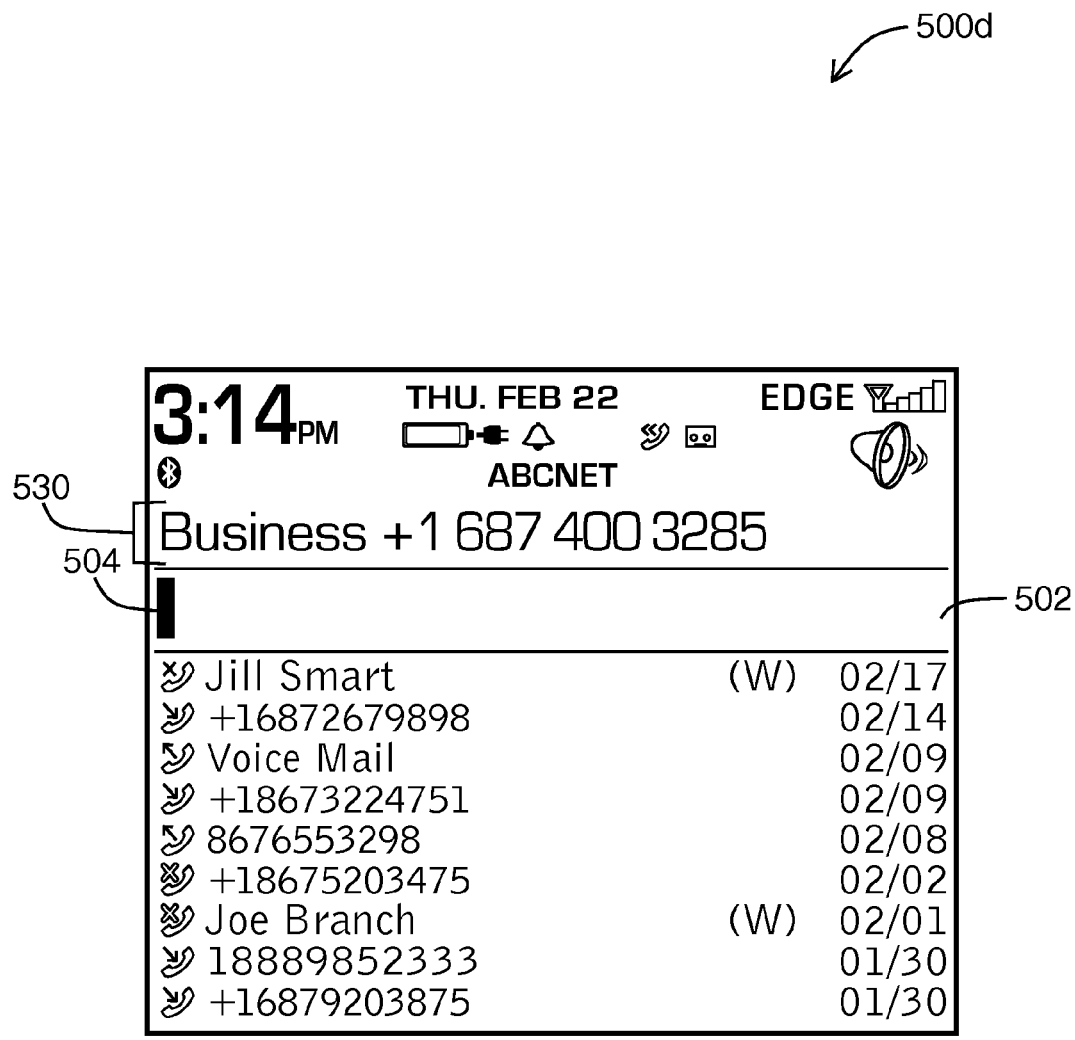

In this example, upon selection of option 564 from options menu 562, the line selection menu 570 is displayed, as shown in FIG. 7D.

It will be understood by persons skilled in the art that the features of the user interfaces illustrated with reference to the example screenshots described herein are provided by way of example only. It will be understood by persons skilled in the art that variations are possible in variant implementations and embodiments.

The steps of a method of providing a user interface that facilitates user selection of a communication line for an outgoing call on a mobile device in accordance with any of the embodiments described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. An electronic device, comprising:
    a display;
    a processor coupled to the display, the processor configured to:
        render a call screen on the display;
        determine a status of at least one calling feature for each of a plurality of communication lines that are selectable for outgoing calls from the electronic device;
        for each of the at least one calling feature, render one general calling feature icon associated with the calling feature in a general calling feature icon display field of the call screen if the calling feature applies to at least one of the plurality of communication lines, and eliminate the one general calling feature icon from the general calling feature icon display field if the respective calling feature applies to none of the plurality of communication lines;
        in response to an input, render on the display a line selection menu identifying at least one of the plurality of communication lines; and
        for each calling feature applying to at least one of the plurality of communication lines, render a line-specific calling feature icon in the line selection menu corresponding to the one of the plurality of communication lines for which the calling feature applies.

2. The device of claim 1, wherein the at least one calling feature comprises call forwarding.

3. The device of claim 1, wherein the at least one calling feature comprises voicemail.

4. The device of claim 1, wherein the at least one calling feature comprises call waiting.

5. The device of claim 1, wherein the at least one calling feature comprises call barring.

6. The device of claim 1, wherein the at least one calling feature comprises missed call detection.

7. The device of claim 1, wherein the processor is further configured to:
    render, on the display, data identifying a first communication line of the plurality of communication lines in an active line data display field of the call screen; and
    for each of the at least one calling feature, render, on the display, a line-specific calling feature icon in the active line data display field of the call screen if the calling feature applies to the first communication line.

8. The device of claim 7, wherein for each of the at least one calling feature, the general calling feature icon rendered therefor is displayed in a header of the call screen.

9. The device of claim 8, wherein the header of the call screen is rendered above the active line data display field of the call screen in the display.

10. The device of claim 1, wherein the processor is further configured to:

in response to receiving a second input identifying a user-selected communication line of the plurality of communication lines, update an active line data display field of the call screen by displaying data identifying the user-selected communication line in the active line data display field, and render, on the display, a line-specific calling feature icon in the active line data display field of the call screen if the calling feature applies to the user-selected communication line.

11. The device of claim 10, wherein for each of the at least one calling feature, the general calling feature icon rendered therefor is displayed in a header of the call screen.

12. The device of claim 11, wherein the header of the call screen is rendered above the active line data display field of the call screen in the display.

13. The device of claim 10, wherein the processor is further configured to initiate an outgoing call using the user-selected communication line at the electronic device.

14. The device of claim 1, wherein the electronic device is configured to receive incoming calls at each of the plurality of communication lines.

15. The device of claim 1, wherein each of the plurality of communication lines has a different telephone number associated therewith.

16. The device of claim 1, wherein the plurality of communication lines comprises a business phone number and a personal phone number.

17. The device of claim 1, wherein the at least one of the plurality of communication lines identified in the line selection menu rendered on the display is restricted to communication lines that have been activated on the electronic device.

18. The device of claim 17, wherein the at least one of the plurality of communication lines identified in the line selection menu rendered on the display is restricted to communication lines on which outgoing calls are permitted to be placed.

19. The device of claim 1, wherein the processor is further configured to render, on the display, data associated with previously made outgoing calls, in the call screen.

20. The device of claim 1, wherein the processor is further configured to render, on the display, data associated with previously received calls, in the call screen.

* * * * *

UNITED STATES PATENT AND TRADEMARK OFFICE
CERTIFICATE OF CORRECTION

| | | |
|---|---|---|
| PATENT NO. | : 8,744,531 B2 | Page 1 of 1 |
| APPLICATION NO. | : 13/908017 | |
| DATED | : June 3, 2014 | |
| INVENTOR(S) | : Keizo Marui | |

It is certified that error appears in the above-identified patent and that said Letters Patent is hereby corrected as shown below:

Title page, item [60]

Insert:

--Related U.S. Application Data

Continuation of application No. 11/691,187, filed on Mar. 26, 2007, now Pat. No. 8,463,325.--

Signed and Sealed this
Twenty-fifth Day of November, 2014

Michelle K. Lee
*Deputy Director of the United States Patent and Trademark Office*